US006981646B2

(12) United States Patent
Lee et al.

(10) Patent No.: US 6,981,646 B2
(45) Date of Patent: Jan. 3, 2006

(54) CHIP EMBEDDED TRADING CARD, RECORDING AND/OR REPRODUCING APPARATUS THEREFOR, AND MESSAGE BUILDING METHOD

(75) Inventors: Kang-hun Lee, Seoul (KR); Wan-sun Hong, Seoul (KR); Kyung-woo Ko, Incheon Metropolitan (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 6 days.

(21) Appl. No.: 09/867,697

(22) Filed: May 31, 2001

(65) Prior Publication Data

US 2002/0015027 A1 Feb. 7, 2002

(30) Foreign Application Priority Data

Jun. 9, 2000 (KR) .............................. 2000-31837

(51) Int. Cl.
*G06K 7/10* (2006.01)

(52) U.S. Cl. ...................................... 235/486; 235/487

(58) Field of Classification Search ................ 125/486; 358/236, 754, 142; 386/61, 62; 235/486, 235/487; 428/136, 62.5, 63, 66.6
See application file for complete search history.

(56) References Cited

U.S. PATENT DOCUMENTS 4,007,355 A * 2/1977 Moreno ...................... 235/379
4,639,225 A * 1/1987 Washizuka .................. 434/308
4,779,138 A * 10/1988 Nomura et al. ............. 348/790
5,411,259 A 5/1995 Pearson et al.
5,612,532 A * 3/1997 Iwasaki ...................... 234/492
5,835,663 A * 11/1998 Momochi .................... 386/61
5,867,795 A * 2/1999 Novis et al. ................ 455/566
5,956,877 A * 9/1999 Raasch et al. ................ 40/702
5,973,250 A * 10/1999 Zirille et al. .................. 84/600
5,982,736 A 11/1999 Pierson
6,083,009 A * 7/2000 Kim et al. .............. 434/307 A
6,282,819 B1 * 9/2001 Gu .......................... 40/124.03

FOREIGN PATENT DOCUMENTS

EP 0 266 926 B1 8/1992
JP 05-104890 4/1993
JP 406215010 * 8/1994

(Continued)

OTHER PUBLICATIONS

Muroi, Electronic game system using a trading-card-type electronic recording medium, May 2, 2002, US Patent Application Publication.*

*Primary Examiner*—Diane I. Lee
*Assistant Examiner*—Kimberly D. Nguyen
(74) *Attorney, Agent, or Firm*—Staas & Halsey LLP

(57) ABSTRACT

A system and method including a trading card and a recording and/or reproducing apparatus recording and/or reproducing subject-related data to/from the trading card, wherein the subject-related data comprises picture information characterizing a subject or reminding a user of the subject. The recording and/or reproducing apparatus includes a transmission and reception unit transmitting subject-related data to and receiving subject-related data from the trading card and a memory unit storing the subject-related data provided through the transmission and reception unit. A key controller in the recording and/or reproducing apparatus inputs a user's manipulation commands and a decoder decodes the picture information from the subject-related data stored in the memory and generating a video signal corresponding to the picture information. A display unit displays the video signal.

31 Claims, 14 Drawing Sheets

FOREIGN PATENT DOCUMENTS

| | | | |
|---|---|---|---|
| JP | 09-045031 | | 2/1997 |
| JP | 09-147545 | | 6/1997 |
| JP | 10-138667 | | 5/1998 |
| JP | 410138667 | * | 5/1998 |
| JP | 11-306310 | | 5/1999 |
| JP | 11-277960 | | 10/1999 |
| WO | WO 96/02047 | | 1/1996 |
| WO | WO 99/30911 | | 6/1999 |

* cited by examiner

CHIP EMBEDDED TRADING CARD, RECORDING AND/OR REPRODUCING APPARATUS THEREFOR, AND MESSAGE BUILDING METHOD

CROSS-REFERENCE TO RELATED APPLICATION

This application is based upon and claims priority of Korean Patent Application No. 00-31837 filed Jun. 9, 2000 in the Korean Industrial Property Office, the contents being incorporated herein by reference.

BACKGROUND OF THE INVENTION

1. Field of the Invention

The present invention relates to a system including a trading card and a recording and/or reproducing apparatus, and more particularly, to a trading card capable of storing subject-related data of a subject shown therein, a recording and/or reproducing apparatus for reproducing data stored in the trading card, or recording the subject-related data in the trading card, and a method which enables communication between the subject in a trading card and its user.

2. Description of the Related Art

Trading cards such as sports cards, music cards, and cartoon cards, illustrate pictures of subjects, such as sports stars, musicians, and cartoon characters and include statistical information, and graphic symbols related to the subject. Also, because trading cards are issued in a limited number a year, the public enjoys collecting the cards.

On most trading cards, still pictures (photos) are printed, but on some trading cards, continuing still pictures are shown using holograms. However, these continuing still pictures have very short life span, and depend on the lighting state. Still pictures (photos) recorded on the existing trading cards do not have systematic mutual relations, which are a series of still pictures printed on a plurality of playing cards used to show a moving picture when viewed in sequence. For instance, a plurality of cards in a sequence of increasing serial numbers can be used to show a movement such as a shooting basketball. Therefore, even though existing trading cards showing still pictures are arranged, an image of mutual relationship cannot be given.

The existing trading card delivers information unilaterally. That is, the owner of a trading card passively receives information recorded in the trading card, and communication between the user and the subject shown on the trading card cannot be expected. However, if the subject shown in the trading card would be able to call with a greeting, the popularity of the trading card would be raised.

SUMMARY OF THE INVENTION

Various objects and advantages of the invention will be set forth in part in the description which follows and, in part, will be obvious from the description, or may be learned by practice of the invention.

To accomplish the above object of the present invention, there is provided a system, including a trading card with a subject printed thereon; a data storage unit in the trading card storing subject-related data; and a recording and/or reproducing unit recording and/or reproducing subject-related data on/from the data storage unit, wherein the subject-related data includes picture and/or text information related to the subject displayed on the trading card; and a housing unit containing and protecting the data storage unit.

To accomplish another object of the present invention, there is also provided a system, including: a trading card; and a recording and/or reproducing apparatus recording and/or reproducing subject-related data to/from the trading card, wherein the subject-related data includes picture information related to a subject, the recording and/or reproducing apparatus including: a transmission and reception unit transmitting subject-related data to and receiving the subject-related data from the trading card, a memory unit storing the subject-related data provided through the transmission and reception unit, a key controller inputting manipulation commands by a user; a decoder decoding the picture information from the subject-related data stored in the memory and generating a video signal corresponding to the picture information, a display unit displaying the video signal generated by the decoder, and a controller controlling the transmission and reception unit, the decoder, and the display unit according to the manipulation commands.

To accomplish another object of the present invention, there is also provided a method of building a message between a subject displayed on a trading card and a user of the trading card, including: using the trading card to store subject-related data of the subject, wherein the subject-related data includes sound or voice information relating to the subject; receiving user-related information from the user; building the message by implementing the user-related data into the subject-related data; storing the message in the trading card; and outputting the message.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Hereinafter, embodiments of the present invention will be described in detail with reference to the attached drawings. The present invention is not restricted to the following embodiments, and many variations are possible within the spirit and scope of the present invention. The embodiments of the present invention are provided in order to completely explain the present invention to anyone skilled in the art.

The present invention provides a trading card including a data storage unit or means has the size, external appearance, and format similar to those of a conventional paper trading card. At the same time, a user can watch, listen, and enjoy image, sound, and text information stored in the data storage unit in the trading card, through a display apparatus or a reproducing apparatus, in accordance with an exemplary embodiment of the present invention.

Also, compared to a connection-type trading card, which communicates subject-related data through an electrical signal, the present invention provides a connectionless-type trading card that communicates subject-related data through an optical or radio signal, enabling reduction in thickness and weight of the reproducing apparatus and allowing a card to be reproduced in a plurality of reproducing apparatuses.

Further, if a user's related information or desired messages are input in the data storage unit, which stores image, sound and text information, through a reproducing apparatus, the user may receive messages (i.e., greetings, introduction of contents, etc.) stored in the data storage unit from a subject shown in the trading card or celebrity (i.e., a sports start, film star, cartoon hero, etc.) to make it appear that the user and the subject are communicating.

The user can also input desired voice or sound information in the data storage unit through software or other input apparatuses so that the voice can be played while watching image and/or text information. The user's related information or desired messages can be input in the trading card of the present invention through a recording apparatus, software, or other input apparatuses. The reproducing apparatus of the present invention can output reproduced moving pictures in a TV receiver, personal computer, digital versatile disc (DVD), head mount device (HMD), camcorder, monitor, etc. If moving pictures stored in a plurality of trading cards are reproduced continuously, a movie including the moving pictures can be implemented, and the user need not change each trading card, thereby saving time.

Figure 1:
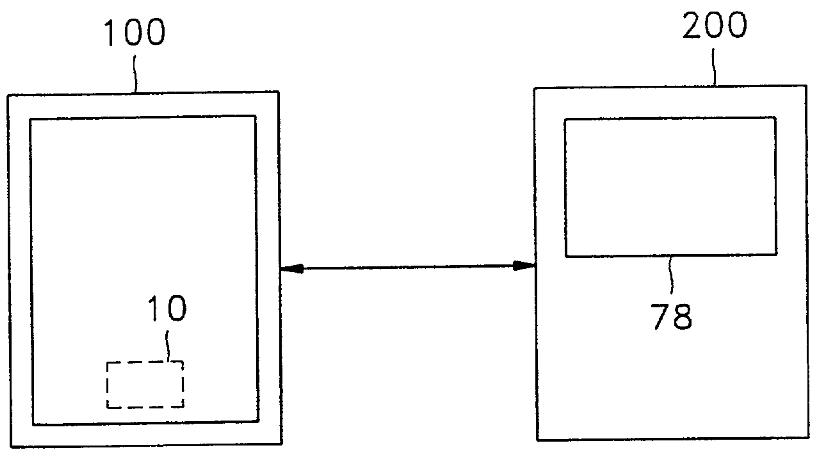
FIG. 1 illustrates a system including a trading card and a recording and/or reproducing apparatus therefore, in accordance with an exemplary embodiment of the present invention.

FIG. 1 illustrates a system including a trading card and a recording and/or reproducing apparatus, means, or unit therefore, in accordance with an exemplary embodiment of the present invention. The trading card 100 has photos, statistical information, or personal information printed on its sides as existing trading cards. In addition the trading card 100 may store data (hereinafter referred to as "subject-related data") related to a subject, such as a celebrity.

The subject-related data includes moving pictures, still pictures, sound, and text information. Text information includes statistical information of the subject, personal information, etc. In addition to subject-related data, user-related information can be recorded in the trading card 100. The subject-related data is stored in a data storage unit 10 contained in the trading card 100. To prevent illegal copying, a copy protection scheme in hardware and software is implemented in the data storage unit 10 and applied to the subject-related data. The data storage unit 10 can be a semiconductor integrated circuit (IC), compact disc, videotape, etc. The semiconductor IC has a semiconductor memory and an input/output (I/O) controller. Still picture, sound, and text information require less memory capacity than moving picture information. However, the moving picture and still picture information can be recorded after being compressed.

The trading card 100 communicates with the recording and/or reproducing apparatus 200 using an electrical signal, an optical signal, or a radio signal. The recording and/or reproducing apparatus 200 reads subject-related data stored in the trading card 100. The read subject-related data is processed according to manipulation commands from the user, and a processed result is displayed in a display unit 78, or through other types of display apparatuses (not shown). The recording and/or reproducing apparatus 200 can record subject-related data provided from other sources such as a computer in the trading card 100.

Figure 2:
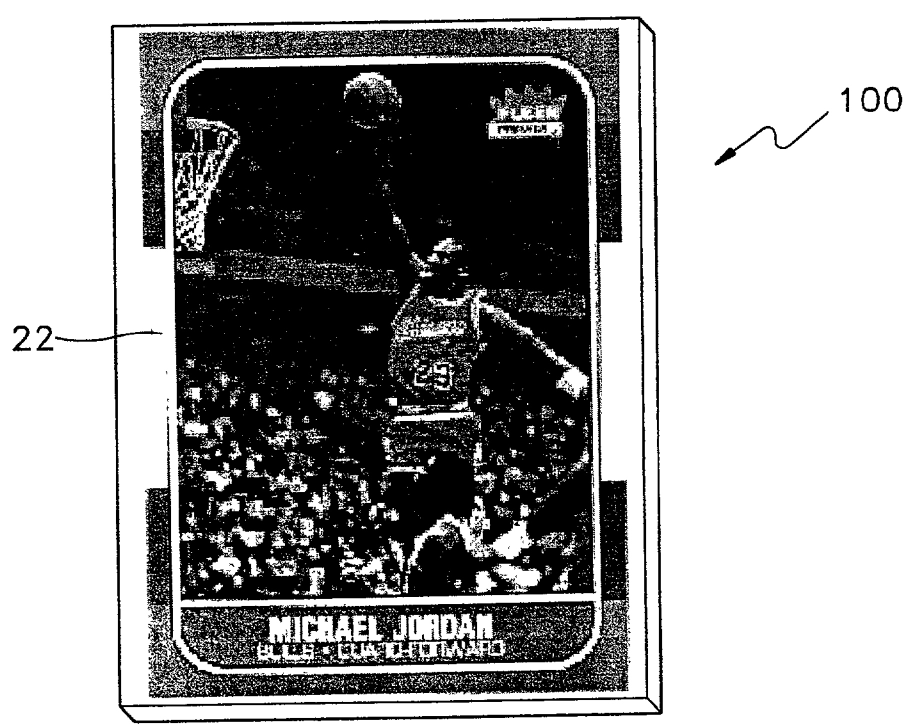
FIG. 2 illustrates an external appearance of the trading card.

FIG. 2 illustrates an external appearance of the trading card 100, in accordance with an exemplary embodiment of the present invention. The trading card 100 includes a front side, on which a full-length photo 22 of a sports star is printed. A connection terminal (not shown) for exchanging an electrical signal with the recording and/or reproducing apparatus 200 can be installed in the backside of the trading card.

Figure 3A:
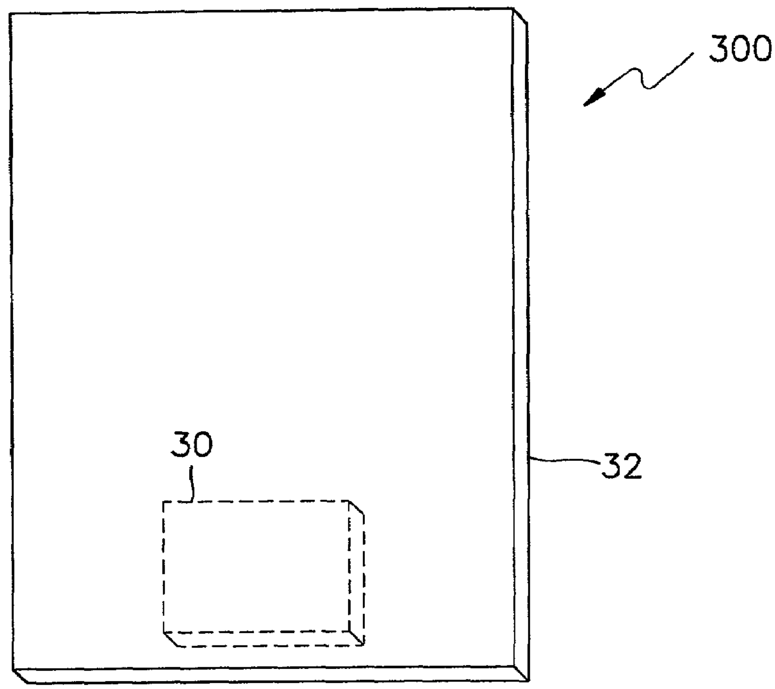
FIGS. 3A and 3B illustrate an exemplary embodiment of the trading card, in accordance with the present invention.
Figure 3B:
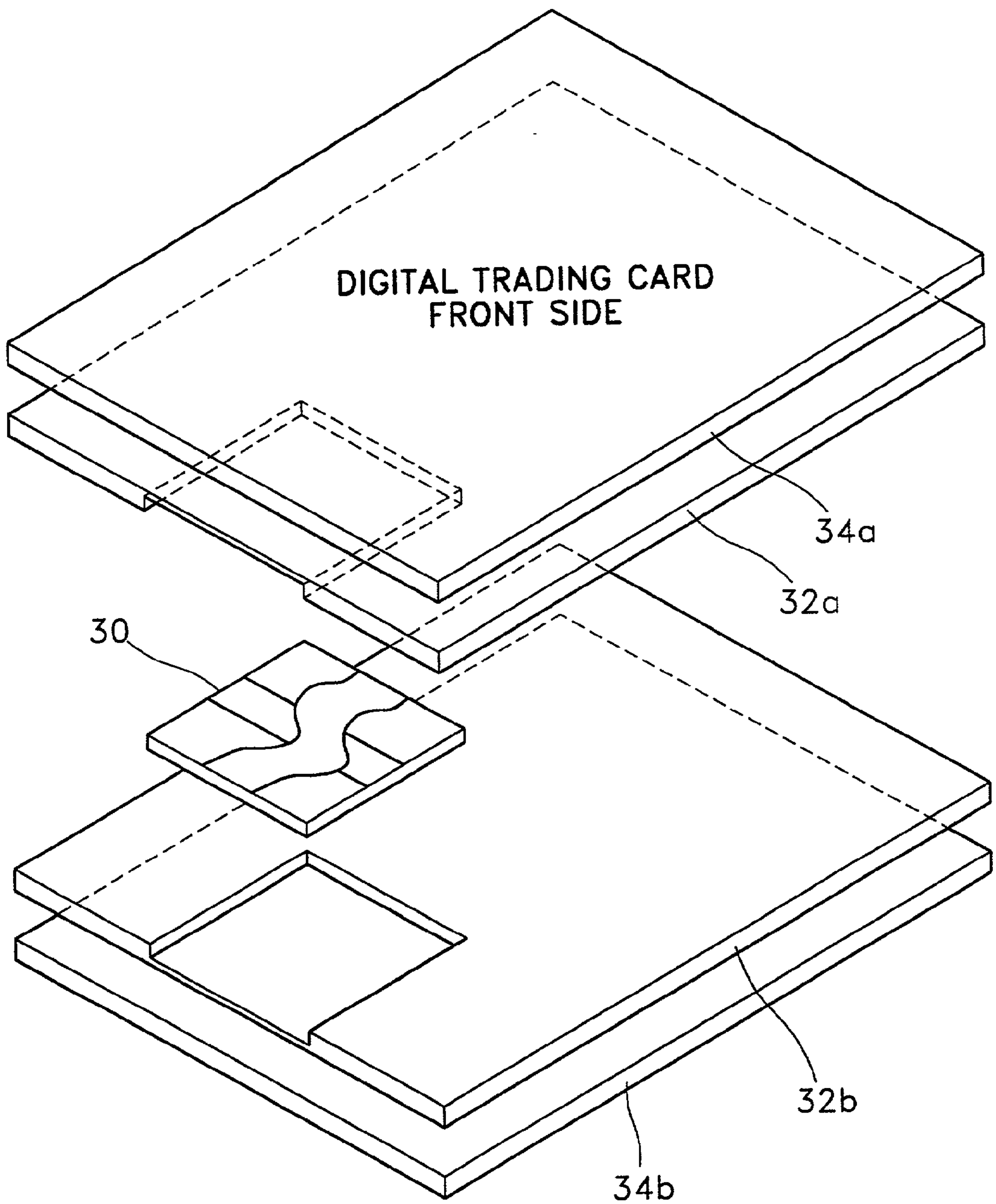

FIGS. 3A and 3B illustrate an exemplary embodiment of the trading card 100 in accordance with the present invention. The trading card 300 shown in FIG. 3A has a connectionless-type semiconductor IC 30 that does not need a connection terminal. The connectionless-type semiconductor IC 30 converts an electromotive force induced by the radio signal applied by the recording and/or reproducing apparatus 200 into power source.

More particularly, referring to FIG. 3A, a portion indicated by solid lines shows a housing 32. The trading card 300 includes the semiconductor IC 30 indicated by dotted lines inside the housing 32, which protects the semiconductor IC 30 from impact, dust, etc. The semiconductor IC 30 generally has a semiconductor memory, an input controller, an output controller, etc. The input controller controls recording subject-related data and user-related data in the semiconductor memory, while the output controller outputs subject-related data and user-related data stored in the semiconductor memory to the recording and/or reproducing apparatus 200. The semiconductor IC 30 transmits subject-related data, which is stored in the form of an optical or radio signal, to the recording and/or reproducing apparatus 200 of FIG. 1, or receives subject-related data from the recording and/or reproducing apparatus 200. The semiconductor IC 30 transmits subject-related data in the form of an optical or radio signal so that one trading card 300 can be reproduced simultaneously in a plurality of recording and/or reproducing apparatuses.

Generally, as shown in FIG. 2, the photo of a sports star is printed on the front side of the housing 32, while other personal information and statistical information are printed on its backside. The material for the housing 32 may include paper or plastic. If the material for the housing 32 is paper, a coating film is applied to strengthen the protection of the housing 32. The portion containing the semiconductor IC 30 can be processed so that the portion has a higher density than other parts. By using paper material for the housing 32, the trading card 300 can give an impression similar to existing trading cards.

FIG. 3B is a sectional view of the trading card shown in FIG. 3A. As shown in FIG. 3B, the housing 32 of the trading card protects the semiconductor IC 30 and is formed of an upper layer 32*a* and a bottom layer 32*b*. Each, the upper layer 32*a* and the bottom layer 32*b* has a rectangular or square shaped groove. Protection films 34*a* and 34*b* cover the upper side and bottom side of the housing 32 for protection. The protection films 34*a* and 34*b* are made, for instance, of a laminated film.

Figure 4:
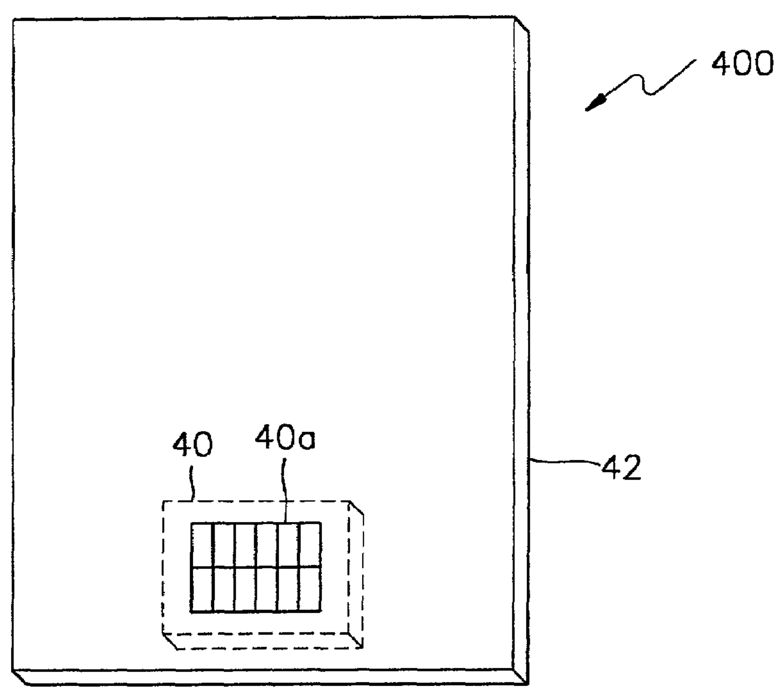
FIG. 4 illustrates an alternative embodiment of the trading card, in accordance with the present invention.

FIG. 4 illustrates an alternative embodiment of a trading card, in accordance with an exemplary embodiment of the present invention. The trading card 400 includes a connection-type semiconductor IC 40. The semiconductor IC 40 has a connection terminal 40*a*. The connection terminal 40*a* is provided for an electrical contact with the recording and/or reproducing apparatus 200 shown in FIG. 1. The power for the operation of the semiconductor IC 40 is provided through the connection terminal 40*a*.

Figure 5A:
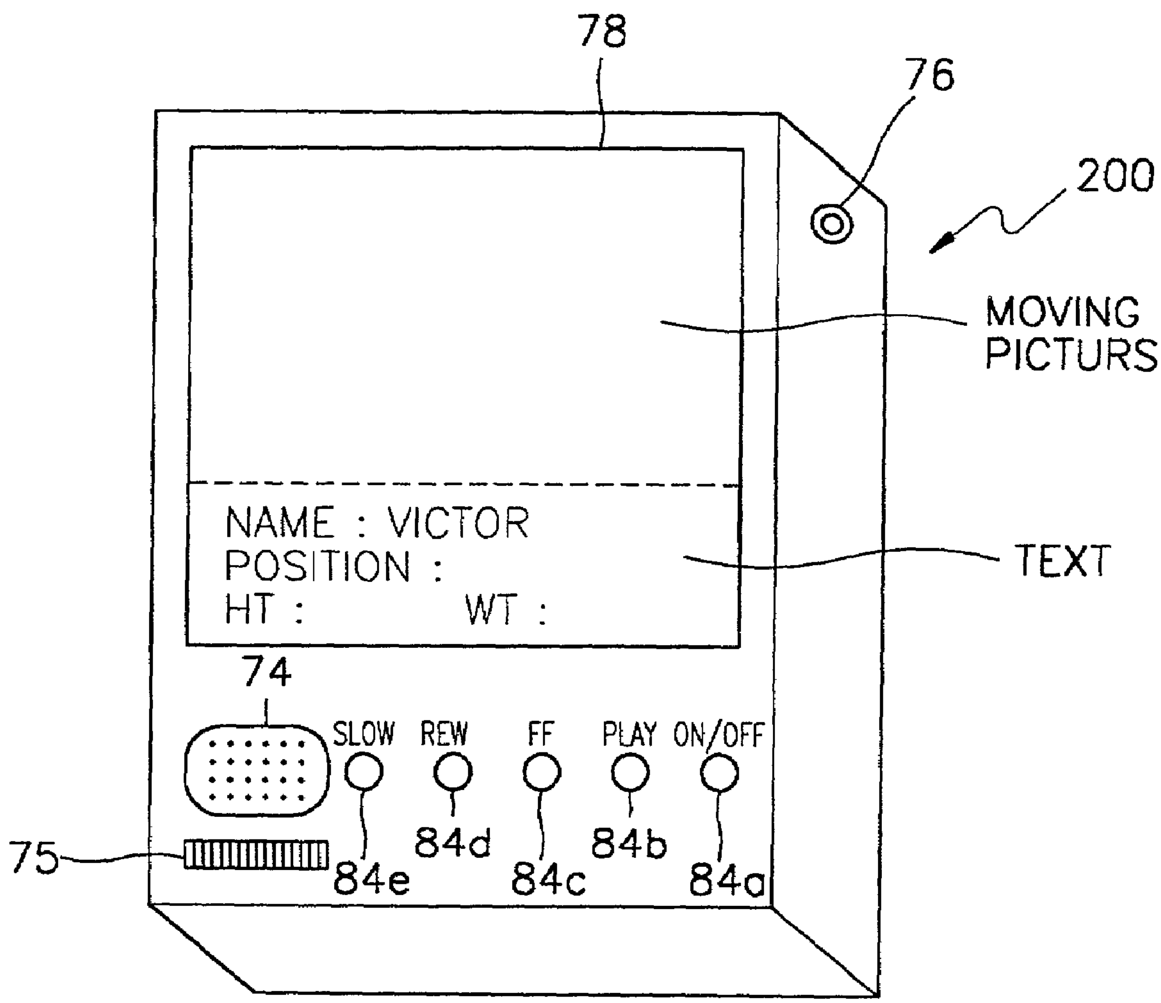
FIGS. 5A and 5B illustrate an external view of the recording and/or reproducing apparatus, in accordance with an exemplary embodiment of the present invention.
Figure 5B:
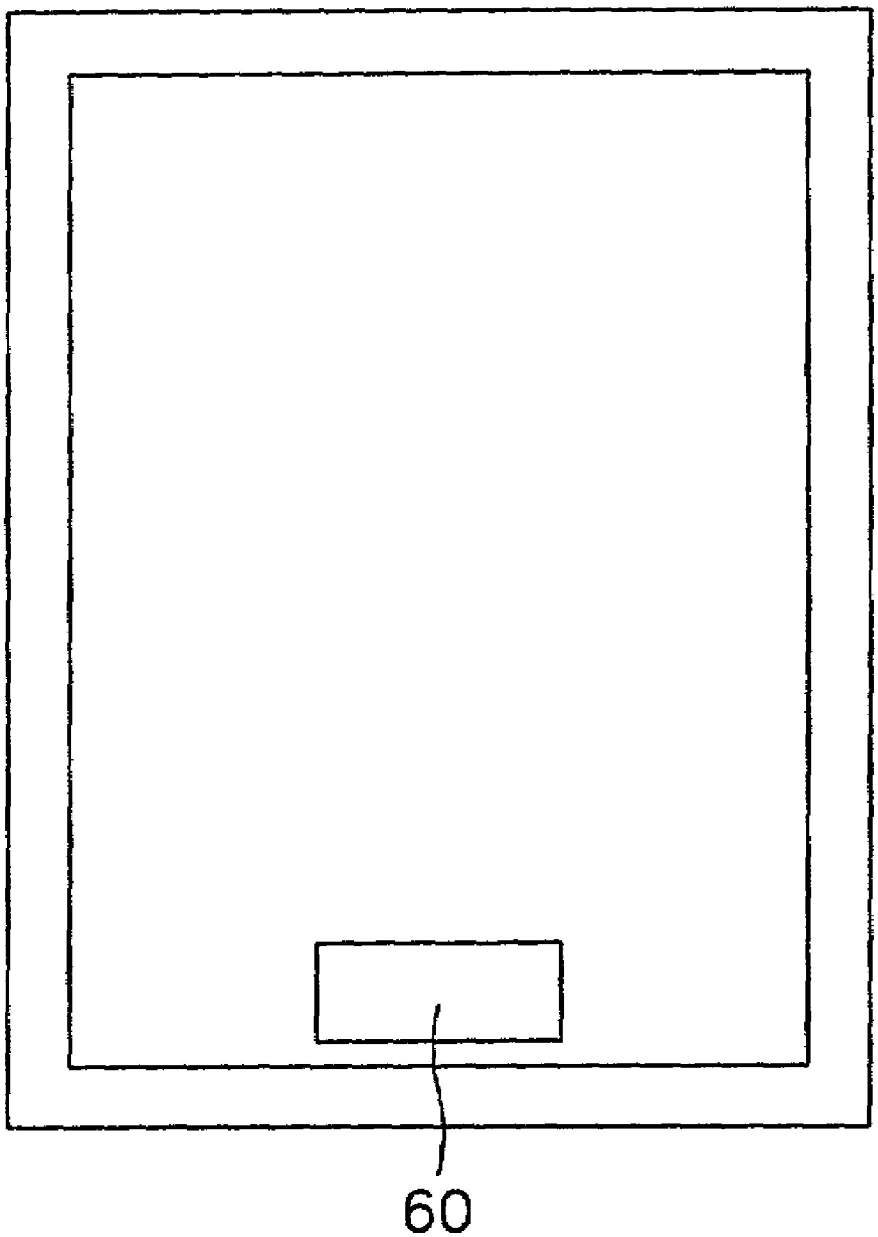

FIGS. 5A and 5B illustrate an external view of the recording and/or reproducing apparatus, in accordance with an exemplary embodiment of the present invention. The apparatus shown in FIGS. 5A and 5B is a connectionless-type recording and/or reproducing apparatus for the connectionless-type trading card 300 shown in FIG. 3. Referring to FIG. 5A, the recording and/or reproducing apparatus 200 includes on its front side a display unit 78, a speaker 74, a volume controller 75, a key controller 84, and an earphone connection jack 76. The key controller 84 includes an ON/OFF button 84*a* to turn on/off the recording and/or reproducing apparatus 200, a play button 84*b* for playing or reproducing subject-related information, a high speed forward reproduction button 84*c*, a rewind button 84*d*, and a slow reproduction button 84*e*. The key controller 84 can further have a recording button (not shown) for recording data in the trading card 100. The display unit 78 displays images, such as moving pictures and still pictures and text information, such as personal information and statistical information. The speaker 74 and the earphone connection jack 76-output sound information. Referring to FIG. 5B, a transmission and reception unit 60 is installed on the backside of the recording and/or reproducing apparatus 200. The transmission and reception unit 60 transmits or receives the subject-related data to/from the connectionless-type trading card 300 shown in FIGS. 3A and 3B.

Figure 6:
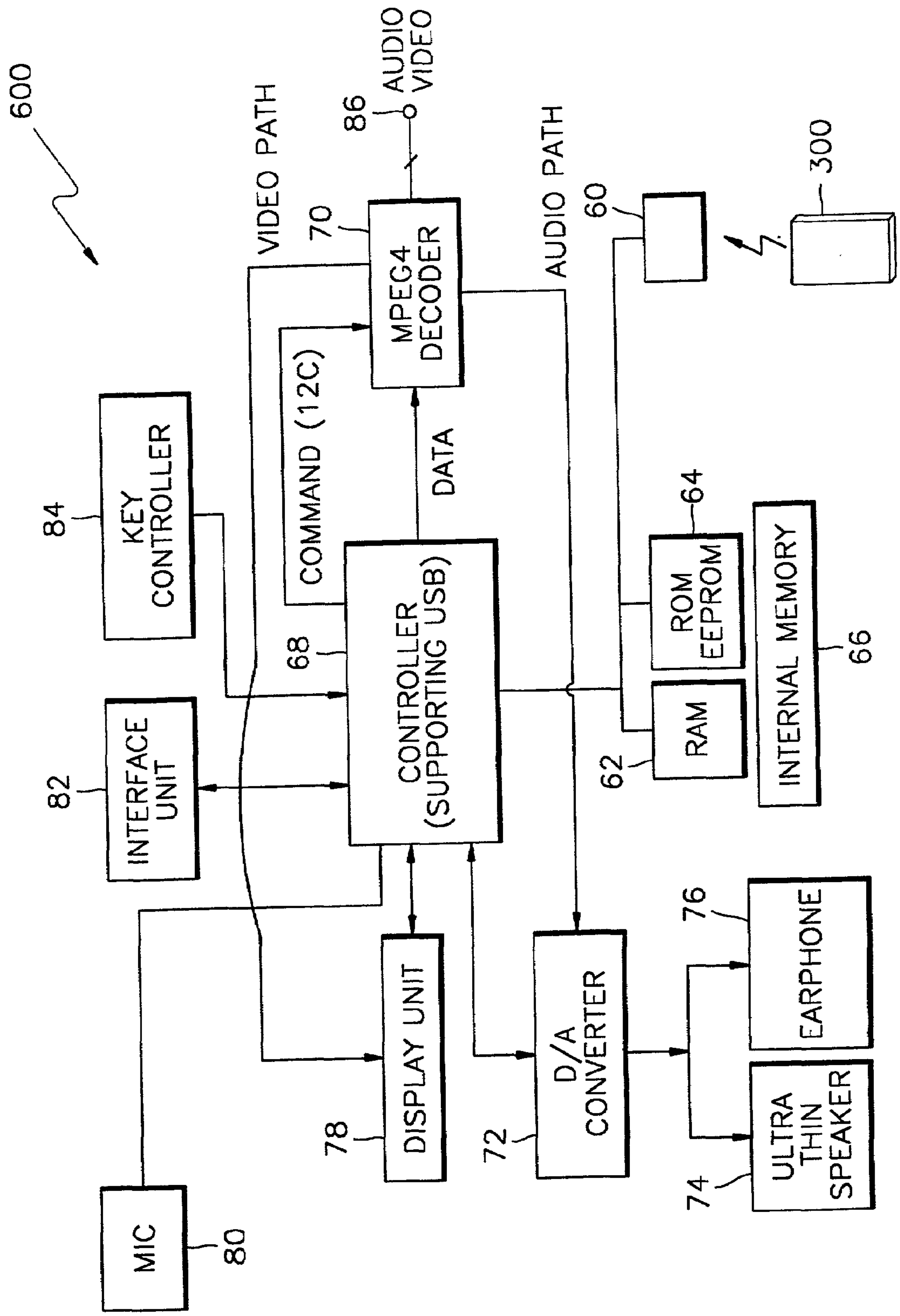
FIG. 6 is a schematic block diagram illustrating an embodiment of the recording and/or reproducing apparatus, in accordance with an exemplary embodiment of the present invention.

FIG. 6 is a schematic block diagram of the recording and/or reproducing apparatus, in accordance with an exemplary embodiment of the present invention. The recording and/or reproducing apparatus of FIG. 6 has a transmission and reception unit 60, a random access memory (RAM) 62, a read-only memory (ROM) 64, an internal memory 66, a controller 68, a decoder 70, a digital-to-analog (D/A) converter 72, a speaker 74, an earphone connection jack 76, a display unit 78, a microphone 80, an interface unit 82, a key controller 84, and an output terminal 86.

Turning to the operation of the recording and/or reproduction apparatus, the transmission and reception unit 60 receives subject-related data through an optical or radio signal from the trading card 300 shown in FIG. 3. The subject-related data transmitted from the trading card 300 is received by the transmission and reception unit 60 and stored in the RAM 62. The ROM 64 stores programs and data for controlling the operations of the reproducing apparatus 600. The key controller 84 receives a command signal from the buttons illustrated in FIG. 5A for reading subject-related data from the trading card 300, reproducing the read subject-related data, or for recording the subject-related data in the trading card 300.

The decoder 70 decodes the subject-related data read from the trading card 300, for instance, moving picture information, compressed still image information, and compressed sound information. Because image information has a large amount of data, the image information may be compressed and then stored in the trading card 300. The compressed image information would be then sent to the recording and/or reproducing apparatus. The examples of the moving picture compression method includes MPEG, MPEG-2, MPEG-4 and MPEG 7, and the examples of the still picture compression method includes JPEG, BMP, etc. The decoder 70 decodes compressed moving picture information, compressed still picture information, and compressed sound information.

The controller 68 operates according to the command signal from the key controller 84. For instance, if the command signal is for reproducing, the controller 68 outputs a signal to the semiconductor IC 30 in the trading card 300 to transmit the subject-related data stored in the semiconductor IC 30 to the reproducing apparatus 600 via the transmission and reception unit 60. The subject-related data transmitted to the recording and/or reproducing apparatus 600 is stored in the RAM 62. The subject-related data stored in the RAM 62 is transmitted to the decoder 70. The image signal reproduced by the decoder 70 is transmitted to the display unit 78. The voice signal reproduced by the decoder 70 is output through the speaker 74 or the earphone connection jack 76. In addition, the controller 68 controls high-speed forward, rewind, and reproduction of text information.

If a command is for recording, the controller 68 commands the trading card 300 to record the subject-related data via the transmission and reception unit 60. Reception of the recording command is recognized through communication with the trading card 300. After receiving a signal from the trading card 300, the controller 68 controls an operation of transferring the subject-related data stored in the RAM 62 to the trading card 300. The subject-related data stored in the RAM 62 is transferred to the trading card 300 via the transmission and reception unit 60. The semiconductor IC 30 receives the recording command from the reproducing apparatus 600 and records the subject-related data transmitted from the recording and/or reproducing apparatus 600 in the semiconductor memory.

The interface unit 82 enables communication with an external computer. More particularly, the reproducing apparatus 600 downloads subject-related data from the external computer through the interface unit 88 and stores the data in the ROM 62, or uploads subject-related data stored in the RAM 62 to the external computer. The interface unit 82 may be a universal serial bus (USB), a parallel port, or infrared light port, etc. The microphone 80 is for inputting the user's voice, and the output terminal 86 is for outputting image and voice signals reproduced by the decoder 70.

Figure 7:
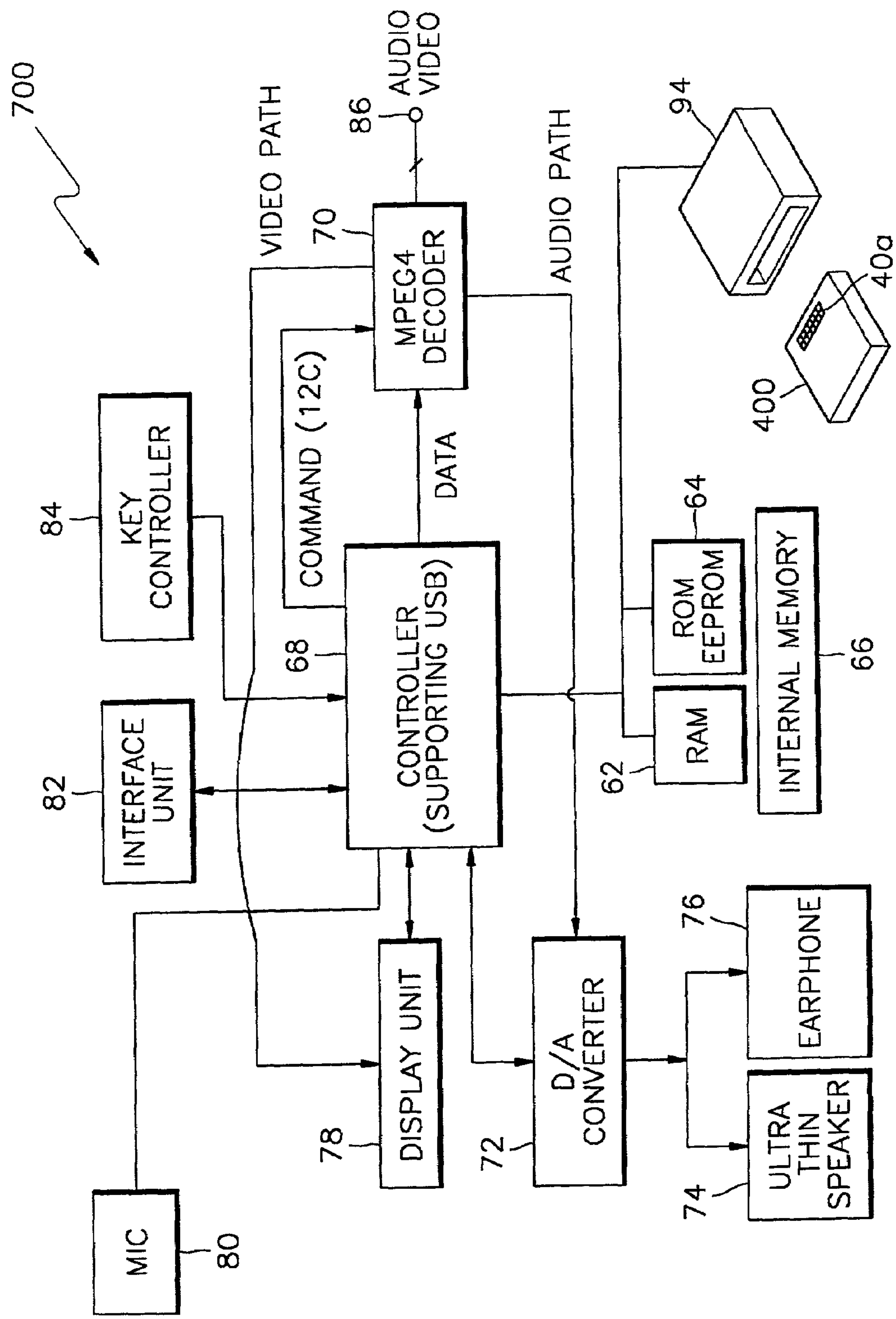
FIG. 7 is a schematic block diagram illustrating an alternative embodiment of the recording and/or reproducing apparatus, in accordance with an exemplary embodiment of the present invention.

FIG. 7 is schematic a block diagram of the recording and/or reproducing apparatus, in accordance with an alternative exemplary embodiment of the present invention. The recording and/or reproducing apparatus of FIG. 7 includes a connection unit 94 instead of the transmission and reception unit 60 of FIG. 6. The connection unit 94 includes a connection terminal (not shown) corresponding the connection terminal 40*a* shown in FIG. 4. The trading card 400 of FIG. 4 is inserted into the connection unit 94.

Figure 8:
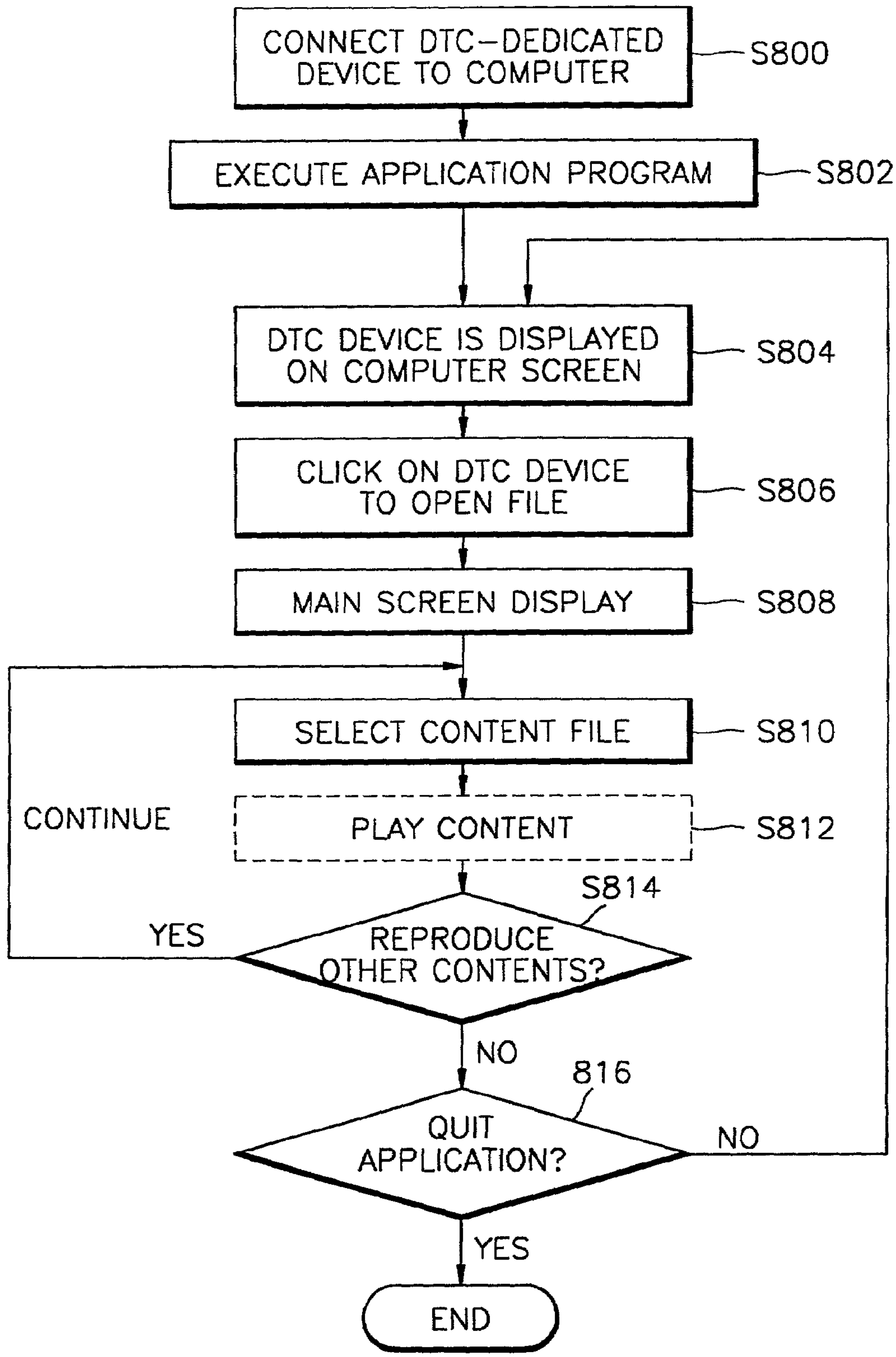
FIG. 8 is a flowchart illustrating a process in which the recording and/or reproducing apparatuses shown in FIGS. 6 and 7 operate being connected to a computer.

FIG. 8 is a flowchart showing a process in which the recording and/or reproducing apparatuses shown in FIGS. 6 and 7 operate while being connected to a computer. At operation 800 the recording and/or reproducing apparatus 600 or 700 is connected to a computer via the interface unit 82, for example, an RS232C cable, a parallel cable, or a USB cable. The connection is determined by a protocol supported by the interface unit 82. At operation 802, an application program for the recording and/or reproducing apparatus 600 or 700 is executed in the computer. At operation 804, icons indicating the recording and/or reproducing apparatus 600 or 700 are displayed on the computer. A plurality of recording and/or reproducing apparatus can be connected to the computer, and by clicking on one of the displayed icons, a desired recording and/or reproducing apparatus can be selected. Accordingly, at operation 806, by clicking on one of the icons, the desired recording and/or reproducing apparatus are selected in.

At operation 808, a main screen for interfacing the selected recording and/or reproducing apparatus is displayed on the computer. On the main screen, content files, such as moving pictures, still pictures, text information, or sound information stored in the trading card which is inserted into the selected recording and/or reproducing apparatus are displayed. At operation 810, a content file is selected and at operation 812 the content file is reproduced. At operation 814, a determination is made whether other content files are to be reproduced. If it is determined that other content files are to be reproduced, the process loops back to operation 810. Otherwise, the process proceeds to operation 816 where a determination is made whether to quit the application program. According to the selection, the process loops back to operation 804 or the execution of the application program is stopped.

Figure 9:
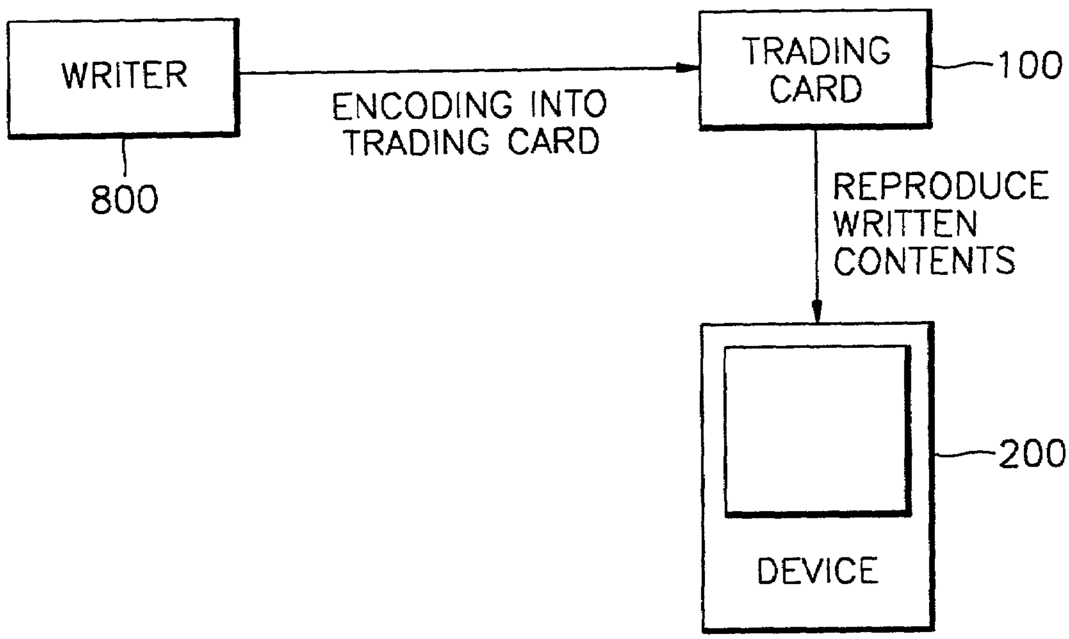
FIG. 9 illustrates a process in which subject-related data is recorded in a trading card.

FIG. 9 illustrates a process in which subject-related data is recorded and reproduced in the trading card 100. Subject-related data is recorded in the trading card 100 by an encoding apparatus 800. The subject-related data recorded in the trading card 100 is reproduced and displayed by either the recording and/or reproducing apparatus 600 or 700 of FIG. 6 or FIG. 7 or by a display device 200.

Figure 10:
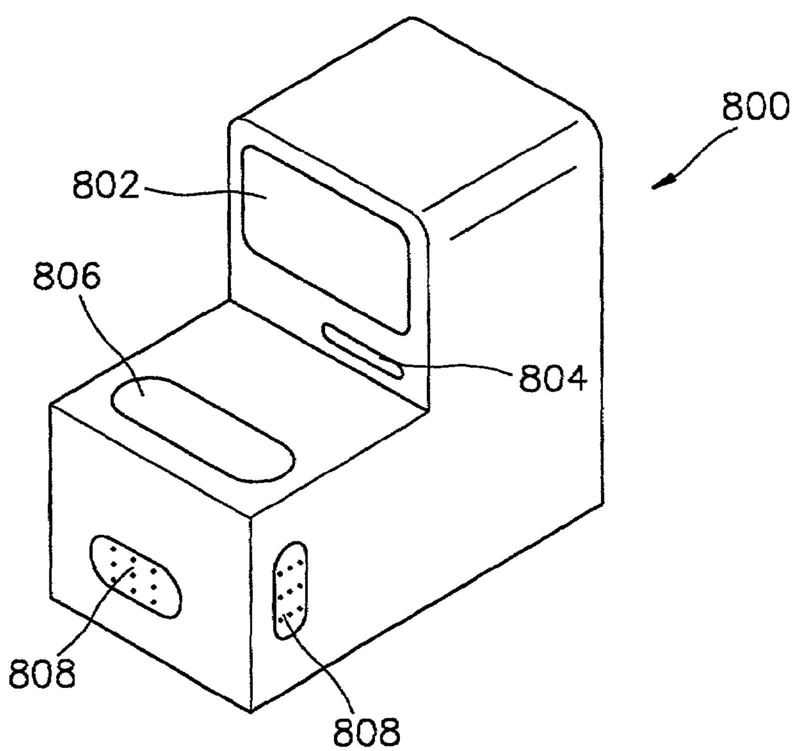
FIG. 10 illustrates an external appearance of the recording apparatus shown in FIG. 9.

FIG. 10 illustrates an external appearance of the encoding apparatus 800 shown in FIG. 9. The encoding apparatus 800 includes a monitor 802, a slot 804, a keyboard 806, and a speaker 808. The trading card 100 is inserted into the slot 804. A person who writes information controls information recording into the trading card 100 through the keyboard 806 and the monitor 802.

Figure 11:
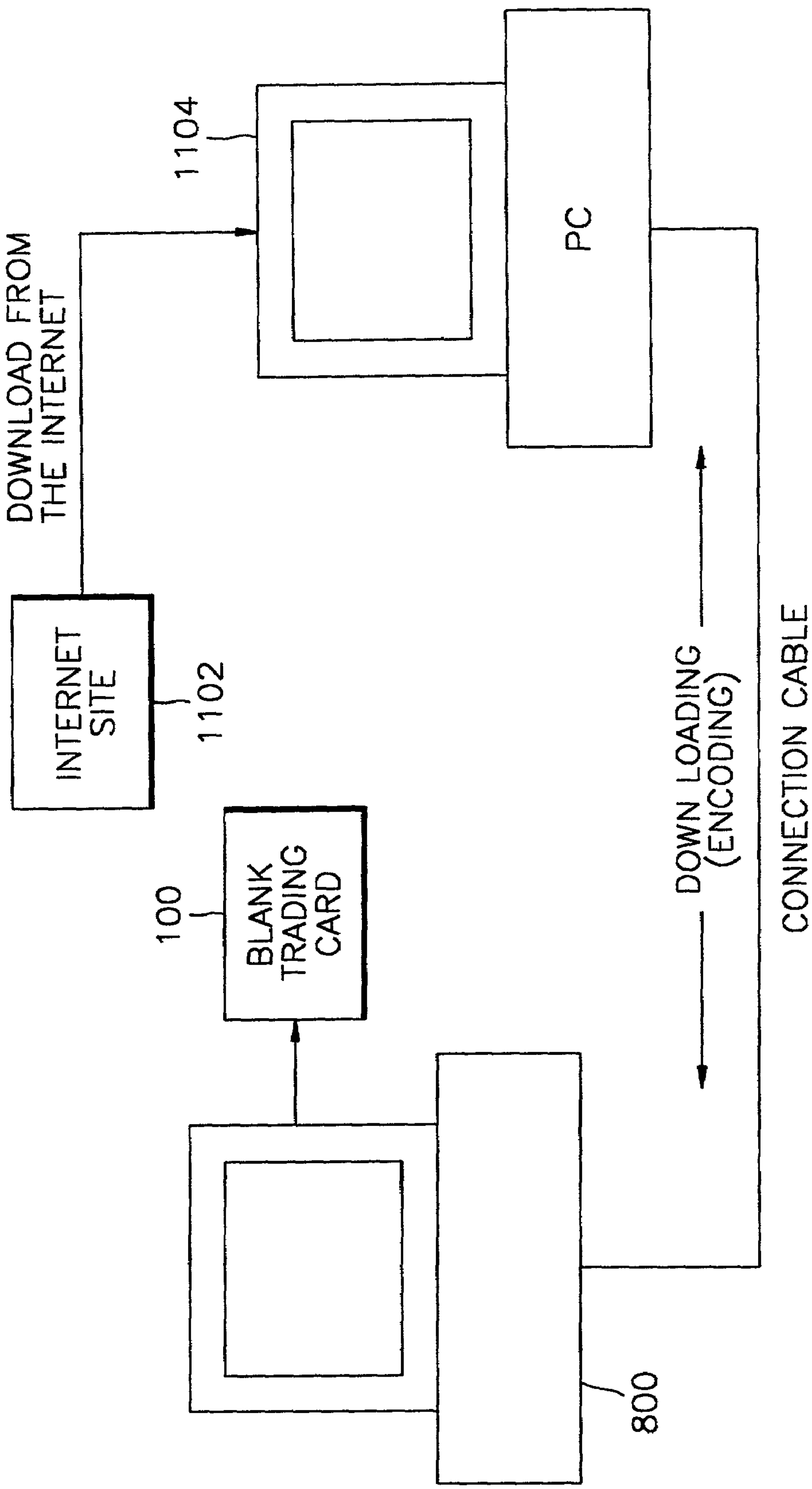
FIG. 11 illustrates a process in which subject-related data is recorded in a trading card.

FIG. 11 illustrates a process in which subject-related data is recorded in a trading card 100. Subject-related data is downloaded from a web site 1102 to a personal computer 1104. The subject-related data downloaded in the personal computer 1104 is provided to the encoding apparatus 800. The encoding apparatus 850 records information in the trading card 100. Subject-related data recorded in the trading card 100 includes moving picture information, still picture information, sound information, and text information. Sound can be moving picture-accompanying sound, or the voice of the subject or the voice of the user having. Text information is information related to the subject. For example, if the subject of the trading card is a sports star, then statistical information, personal information, etc. of the sports subject may be recorded.

Moving picture information stored in the trading card 100 can have a sequence. Specifically, the trading card has a serial number as identification, and the moving pictures stored in trading cards having neighboring serial numbers have a sequence. In this case, the collection value of the trading card can be enhanced.

Figure 12:
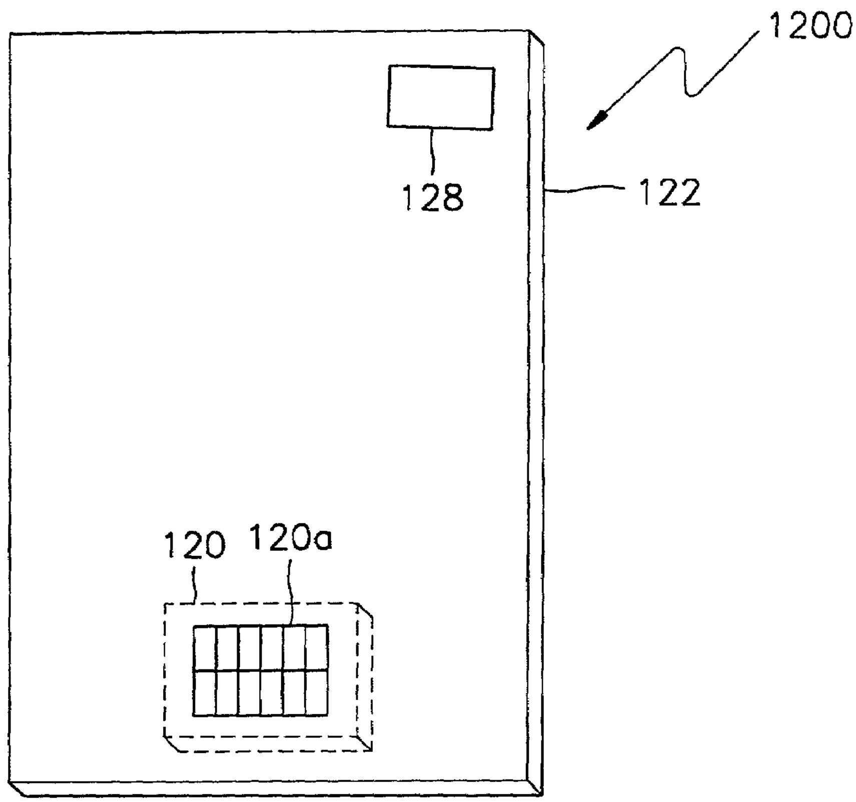
FIG. 12 illustrates an alternative embodiment of the trading card, in accordance with the present invention.
Figure 13:
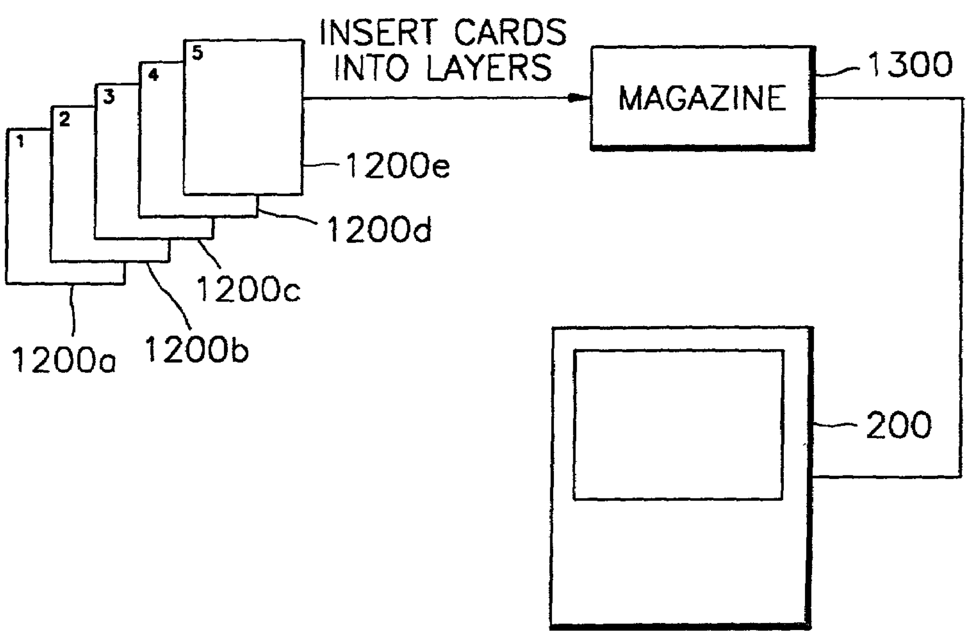
FIG. 13 illustrates a process in which the trading cards shown in FIG. 12 are reproduced.

FIG. 12 illustrates an alternative embodiment of the trading card according to the present invention. FIG. 13 illustrates a process in which the trading cards shown in FIG. 12 are reproduced. Each of the trading cards 1200 shown in FIG. 13 further has an identification means 128. Referring to FIG. 12, a housing 122 supports an IC 120, a pin 120A, and identification 128, and the identification 128 may be formed by printing or etching. The identification 128 includes the serial number, and trading cards having neighboring serial numbers store moving pictures in a sequence.

Referring to FIG. 13, a magazine 1300 can load a plurality of trading cards. When reproducing moving pictures, the recording and/or reproducing apparatus 200 sequentially reproduces moving pictures stored in the trading cards 1200A through 1200E loaded in the magazine 1300.

The magazine 1300 removes the burden of exchanging trading cards one by one when trading cards are reproduced continuously. The magazine 1300 process the subject-related data from the loaded trading cards 1200A through 1200E, and transmit the subject-related data sequentially to the recording and/or reproducing apparatus 200. The reproduced signal by the recording and/or reproducing apparatus according to the present invention can be provided to a TV, a computer, a video recorder, a camcorder, and other display units.

Figure 14A:
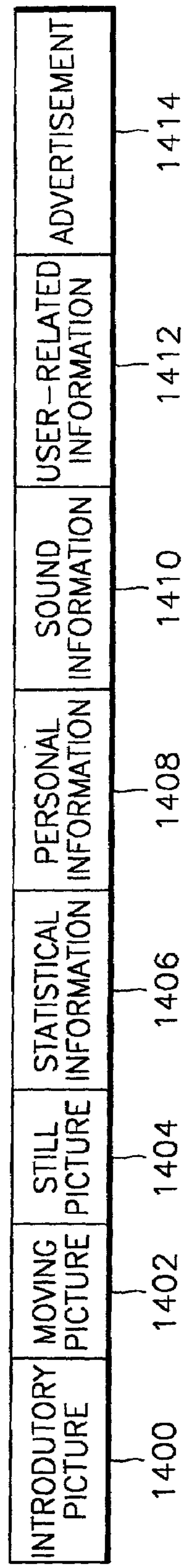
FIGS. 14A and 14B illustrate examples of data recorded in a trading card.
Figure 14B:
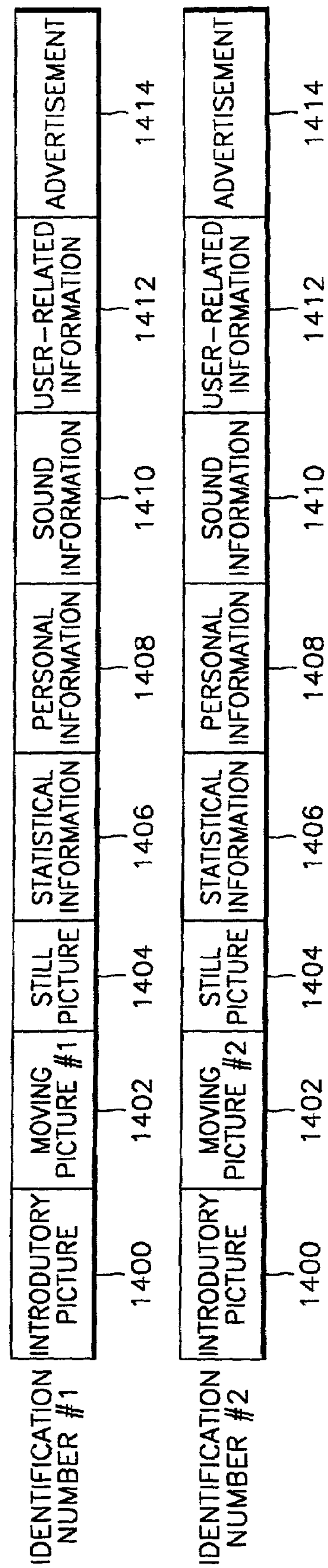

FIGS. 14A and 14B illustrate an example of data recorded in a trading card 100. Referring to FIG. 14A, the trading card 100 has an introductory picture 1400, the card subject's moving pictures 1402, still pictures 1404, statistical information 1406, personal information 1408, sound information 1410, user-related information 1412, and sponsor's advertisement 1414. The card subject's statistical information 1406 and personal information 1408 are text information. The card subject's sound information is obtained by sampling the voice of the subject. The sound information can separately include voice-synthesizing parameters for recording and/or reproducing the voice of the subject and for implementing the voice of the user into the subject's voice thereby giving the impression that the user and the subject are involved in a conversation.

FIG. 14B shows data format recorded in the trading cards having continuing identification numbers. If the first trading card has an identification number #1, and the second trading has an identification number #2, the first trading card has the first moving picture 1402 (moving picture #1) and the second trading card has the second moving picture 1402 (moving picture #2), as shown in FIG. 14B. The moving pictures #1 and #2 are in a time sequence.

Figure 15:
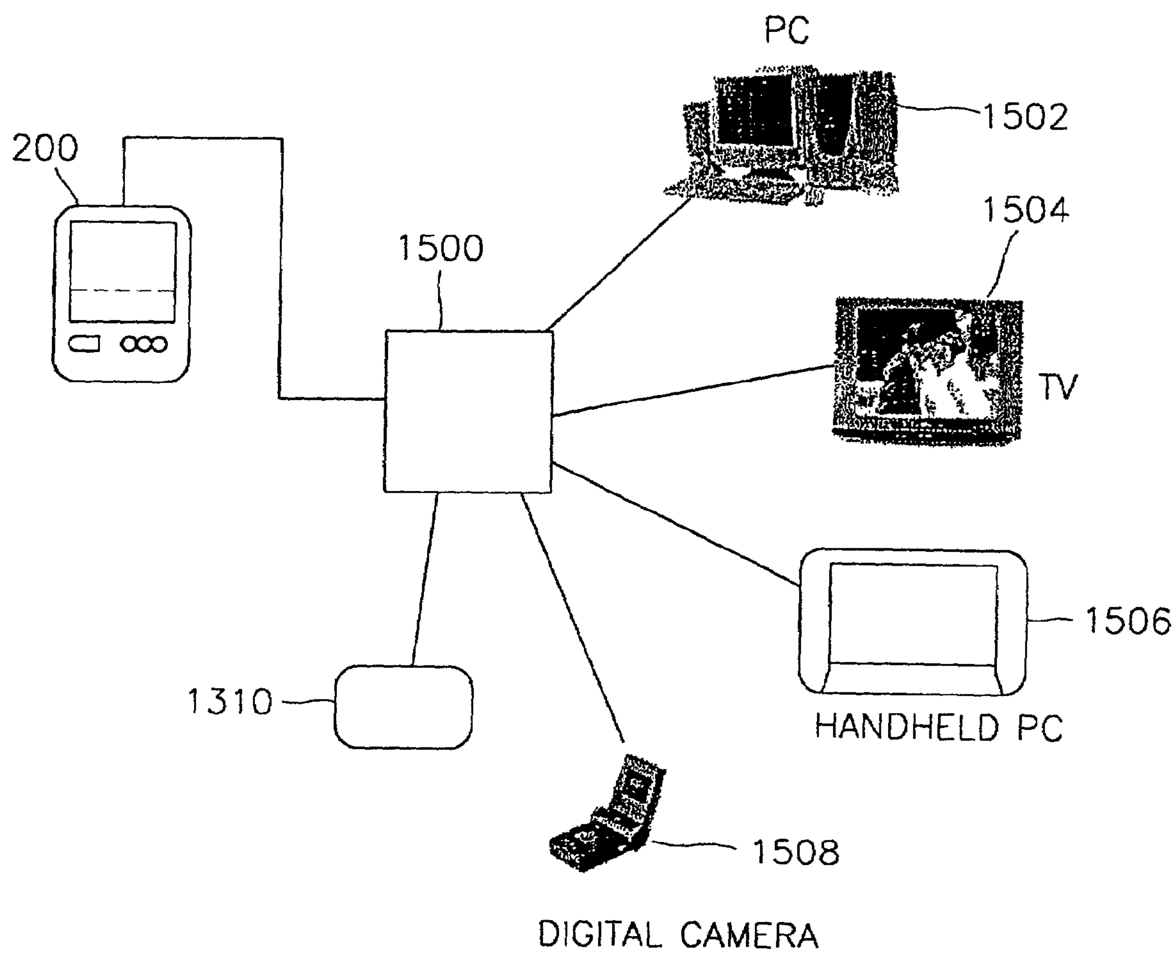
FIG. 15 illustrates a connectivity between a recording and/or reproducing apparatus and other devices.

FIG. 15 illustrates a relation between the recording and/or reproducing apparatus 200 and other devices. A video and/or audio signal output from the output terminal of the recording and/or reproducing apparatus 200 is provided to a computer 1502, a TV 1504, a hand-held computer 1506, a digital camera 1508, and other display apparatuses through an adaptor 1500. By using the recording and/or reproducing apparatus 200 and the adaptor 1500, the subject's moving pictures and still pictures may be magnified and the pictures may be stored in the data storage unit.

The recording and/or reproducing apparatus 200 according to the present invention, allows the user to receive subject-related data, such as images and/or voice messages from the subject, using the user's sound, and user-related information. For example, if a user inputs his name, for example, John Young, the recording and/or reproducing apparatus 200 can be implemented that the subject greets the user, saying "Hi, John. This is Michael." This conversation can be implemented by a text, or by a voice synthesizing. Parameters required for voice synthesizing are extracted from the subject's sound information recorded in the trading card.

Figure 16:
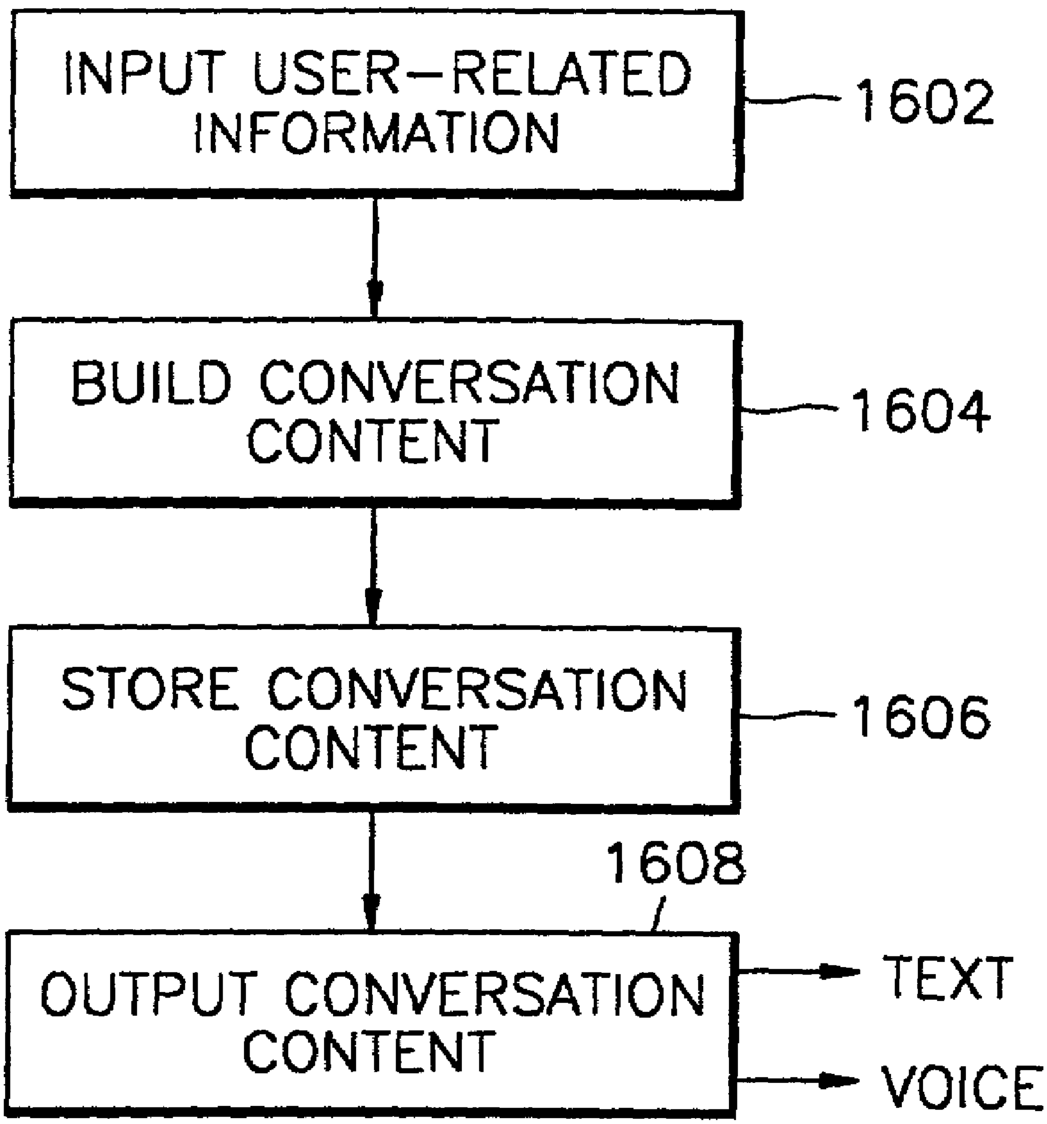
FIG. 16 is a flowchart showing a communication realizing method, in accordance with an exemplary embodiment of the present invention.

FIG. 16 is a flowchart showing a communication realizing method, in accordance with an exemplary embodiment to the present invention. At operation 1602, user-related information is input. The user-related information can be a name, a date of user's birth, etc. User-related information is recorded in the encoding apparatus 850 installed in a shop for trading cards 100. At operation 1604, the contents of a message are built using the user-related information. For example, if the user's name is John Young, greeting sentences from the subject to the user, saying "Hi, John. This is Michael." May be created. The sentences are created as follows: a sentence having an empty space for the user's name is prepared, the user inputs his name, and the input name is written in the empty space. By doing so, a greeting from the subject to the user is prepared.

At operation 1606, the message contents are recorded in the trading card 100. At operation 1608, the recording and/or reproducing apparatus 200 checks whether or not the message contents exist for reproducing in the trading card 100, and if the contents exist, the contents are output on a text screen or as a voice. When the contents are output as a voice, parameters required for synthesizing the voice are extracted from the subject's voice signal stored in the trading card 100, and applied to the built conversation contents to synthesize a voice.

Though the embodiment of the present invention is described with a sport star as the subject of the trading card, the subject of the trading card can be a musician, friends, pets, and other things. For example, the contents of the trading card according to the present invention can be extended to include cartoon characters or other interesting characters. As described above, the trading card according to the present invention has a semiconductor IC for storing moving pictures and providing more subject-related data than the existing trading cards.

While the present invention has been particularly shown and described with reference to the preferred embodiment thereof, it will be understood by those skilled in the art that various changes in form and details may be effected therein without departing from the spirit and scope of the invention as defined by the appended claims.

What is claimed is:

1. A trading card communicating with a recording and/or reproducing unit to receive messages from a subject printed on the card, the trading card comprising:

a data storage unit receiving a recording command from the recording and/or reproducing unit to record and store the subject-related data stored in the recording and/or reproducing unit from the subject; and a housing unit containing and protecting the data storage unit, wherein the housing unit comprises a serial number identifying the trading card, and the messages are based on recorded user-related information and are built by implementing the user-related data into the subject-related data.

2. A recording and/or reproducing unit allowing a user of a trading card to receive subject-related data from a subject printed on the card, the recording and/or reproducing unit comprising:

a recording and/or reproducing unit recording and/or reproducing subject-related data on/stored in the trading card according to manipulation commands from the user and user-related data from the user, and building a message by implementing the user-related data into the subject-related data and displays and/or sound reproduces the message, wherein the subject-related data comprises moving picture information arranged in a sequence using serial numbers, still picture information, voice or sound information, and/or text information.

3. A system, comprising:

a recording and/or reproducing unit recording and/or reproducing subject-related data from a subject shown on a trading card and user-related data from a user of the trading card; and a data storage unit in the trading card receiving a recording and/or reproducing command from the recording and/or reproducing unit to record the subject-related data stored in the recording and/or reproducing unit or receiving a reproduction command from the recording and/or reproducing unit to reproduce the subject-related data stored in the data storage unit, wherein the recording and/or reproducing unit processes and builds a message by implementing the user-related data into the subject-related data and displays and/or sound reproduces the message.

4. The system as recited in claim 3, wherein the subject-related data comprises image, sound, and/or text information.

5. The system as recited in claim 3, further comprising an encoding unit comprising a slot to insert the trading card and record subject-related data being encoded by the user and transmitting the recorded subject-related data to the recording and/or reproducing apparatus.

6. A system, comprising:

a trading card with a subject printed thereon;

a data storage unit in the trading card storing subject-related data; and an encoding apparatus recording user-related information, building a message by implementing the user-related data into the subject-related data, and recording the contents of the message in the trading card;

a recording and/or reproducing unit recording and/or reproducing subject-related data on/from the data storage unit and/or reproducing the message recorded in the trading card, wherein the subject-related data comprises picture and/or text information related to the subject displayed on the trading card; and a housing unit containing and protecting the data storage unit.

7. The system as recited in claim 6, wherein the data storage unit is a connectionless semiconductor integrated circuit (IC) interfacing with a transmission and reception unit in the recording and/or reproducing unit to transmit or receive the subject-related data and operational power.

8. The system as recited in claim 6, wherein the data storage unit is a connection-type semiconductor IC comprising a connection terminal to interface with the recording and/or reproducing apparatus to transmit or receive the subject-related data and operational power.

9. The system as recited in claim 6, wherein the data storage unit comprises:

a semiconductor memory storing the subject-related data; and an output controller controlling reading the subject-related data from the semiconductor memory.

10. The system as recited in claim 6, wherein the data storage unit comprises:

an input controller recording the subject-related data in the semiconductor memory.

11. The system as recited in claim 6, wherein the subject-related data comprises moving picture and still picture information related to the subject.

12. The system as recited in claim 11, wherein the subject-related data further comprises sound information related to the subject.

13. The system as recited in claim 12, wherein the subject-related data further comprises text information related to the subject, such as statistical information and personal information.

14. The system as recited in claim 6, wherein the housing unit comprises a coating film.

15. The system as recited in claim 6, wherein the housing unit comprises an identifier identifying the trading card.

16. The system as recited in claim 15, wherein the identifier comprises a serial number, and further comprising:

trading cards comprising continuing serial numbers associated with continuing moving picture information.

17. A system, comprising:

a trading card;

a recording and/or reproducing apparatus recording and/or reproducing subject-related data to/from the trading card, wherein the subject-related data comprises picture information related to a subject; and an encoding apparatus recording user-related information, building a message by implementing the user-related data into the subject-related data, and recording the contents of the message in the trading card, wherein the recording and/or reproducing apparatus comprises:

a transmission and reception unit transmitting the message to and receiving the message from the trading card, a memory unit storing the message provided through the transmission and reception unit, a key controller inputting manipulation commands by a user, a decoder decoding the picture information from the subject-related data stored in the memory and generating a video signal corresponding to the picture information, a display unit displaying the video signal generated by the decoder, and a controller controlling the transmission and reception unit, the decoder, and the display unit according to the manipulation commands.

18. The system as recited in claim 17, wherein the transmission and reception unit comprises a connection terminal providing an electrical contact with the trading card.

19. The system as recited in claim 17, wherein the transmission and reception unit transmits an optical or radio signal to and receives an optical or radio signal from the trading card.

20. The system as recited in claim 17, wherein the recording and/or reproducing unit further comprises:

an output terminal outputting the video signal reproduced by the decoder.

21. The system as recited in claim 17, wherein the recording and/or reproducing unit further comprises:

a speaker outputting a voice signal through the controller.

22. The system as recited in claim 21, wherein the recording and/or reproducing unit further comprises:

an earphone connection jack outputting the voice signal through the controller to an earphone.

23. The system as recited in claim 17, wherein the recording and/or reproducing unit further comprises:

an interface unit outputting the subject-related data stored in the memory unit to an external device or receiving the subject-related data provided from the external device.

24. The system as recited in claim 17, wherein the controller transmits the subject-related data stored in the memory unit to the trading card, in response to a recording command applied from the key controller.

25. A method of recording subject-related data from a web site to a trading card using an encoding unit, comprising:

downloading the subject-related data from the web site to a computer;

providing the subject-related data from the computer to the encoding unit; and recording the subject-related data in the trading card using the encoding unit, wherein the subject-related data comprises moving picture information arranged in a sequence using serial numbers, still picture information, voice or sound information, and/or text information relating to a subject printed on the trading card.

26. A method, comprising:

loading trading cards into a magazine;

processing subject-related data stored in the trading cards;

transmitting the subject-related data to a recording and/or reproducing apparatus, wherein the subject-related data comprises moving pictures arranged in a sequence using serial numbers; and processing the serial numbers to sequentially reproduce the moving pictures via a display unit.

27. A method to build a message between a trading card user and a subject shown in the trading card via an encoding unit and a recording and/or reproducing unit, the method comprising:

recording user-related information in the encoding unit;

building the message using the user-related information;

recording the message in the trading card; and outputting the message recorded in the trading card through the recording and/or reproducing unit.

28. The method as recited in claim 27, wherein the outputting the message through the recording and/or reproducing unit is output through a screen or a speaker.

29. A method of building a message between a subject displayed on a trading card and a user of the trading card, comprising:

using the trading card to store subject-related data of the subject, wherein the subject-related data comprises sound or voice information relating to the subject;

receiving user-related information from the user;

building the message by implementing the user-related data into the subject-related data;

storing the message in the trading card; and outputting the message.

30. The method of claim 29, wherein the outputting of the content comprises displaying the message in the form of text information.

31. The method of claim 29, wherein the outputting the message further comprises:

reading a sound signal indicating the voice of the subject from the subject-related data;

extracting parameters for synthesizing the voice, from the sound signal;

synthesizing the voice for building content of the message, using the parameters extracted; and outputting a voice synthesized signal through a speaker.

* * * * *

UNITED STATES PATENT AND TRADEMARK OFFICE

CERTIFICATE OF CORRECTION

PATENT NO. : 6,981,646 B2
APPLICATION NO. : 09/867697
DATED : January 3, 2006
INVENTOR(S) : Kang-Hun Lee et al.

It is certified that error appears in the above-identified patent and that said Letters Patent is hereby corrected as shown below:

On the Title Page: Column 2 (57) Abstract, line 4, replace “comprises” with --includes--.

Signed and Sealed this

Twenty-fifth Day of July, 2006

JON W. DUDAS
*Director of the United States Patent and Trademark Office*